United States Patent [19]

Nomura et al.

[11] Patent Number: 4,607,088

[45] Date of Patent: Aug. 19, 1986

[54] SHAPED BODY FOR GAS SEPARATION

[75] Inventors: Hirokazu Nomura, Kanagawa; Susumu Ueno, Ibaraki; Hajime Kitamura, Chiba, all of Japan

[73] Assignee: Shin-Etso Chemical Co., Ltd., Tokyo, Japan

[21] Appl. No.: 732,377

[22] Filed: May 3, 1985

[30] Foreign Application Priority Data

May 4, 1984 [JP] Japan ................................ 59-89843

[51] Int. Cl.$^4$ ............................................. C08F 38/00
[52] U.S. Cl. ................................................. 526/279
[58] Field of Search .............................. 526/279, 285

[56] References Cited

FOREIGN PATENT DOCUMENTS 2106702 8/1971 Fed. Rep. of Germany .
2079814 12/1971 France .

OTHER PUBLICATIONS

Journal of Organometallic Chemistry, vol. 10, pp. 427–437, 1967.
Journal of Organometallic Chemistry, vol. 18, pp. 55–67, 1969.

Primary Examiner—Paul R. Michl
Attorney, Agent, or Firm—Wenderoth, Lind & Ponack

[57] ABSTRACT

The inventive shaped body for gas separation is prepared on the base of a film shaped of a poly(silyl acetylene) such as poly(1-methyl-2-trimethylsilyl acetylene) by subjecting the base film to a treatment of exposure to an atmosphere of low temperature plasma of an inorganic gas, e.g. nitrogen, hydrogen, argon, etc. Contrary to expectation, the base film is stable against the plasma treatment without decrease in the mechanical strengths and imparted with high performance for gas separation, especially, for the enrichment of oxygen in air with a separation factor between oxygen and nitrogen of 2.5 to 3.5.

7 Claims, No Drawings

SHAPED BODY FOR GAS SEPARATION

BACKGROUND OF THE INVENTION

The present invention relates to a shaped body for gas separation having high permeability to gases and excellent performance for the selective separation of gases or, more particularly, to a shaped body for gas separation suitable for obtaining a gaseous mixture highly enriched with respect to the content of oxygen from atmospheric air.

As a trend in recent years, the process of selective gas separation utilizing polymer membranes is highlighted and is replacing the conventional processes for gas separation such as deep-freeze liquefaction and adsorption on an adsorbent more and more from the standpoint of energy saving and prevention of environmental pollution. In particular, a variety of applications are expected for the so-called oxygen-enriching membranes with which a gaseous mixture highly enriched in respect of the oxygen content can be obtained from the atmospheric air including the medical uses and the fields involving combustion of fuels. The development of such a material usable in practical use is eagerly desired.

Oxygen enriching membranes should satisfy several requirements of which the most essential are a high separation factor between oxygen and nitrogen and a high permeability to or velocity of permeation of these gases in order to obtain a high processing capacity. In this regard, although a relatively high separation factor can be obtained with an oxygen enriching membrane by use of certain homogeneous polymeric materials now under development, no practically usable oxygen enriching membrane has yet been developed due to the remarkably low velocity of gas permeation. A relatively high velocity of gas permeation can be obtained by use of a porous shaped body although no sufficiently high separation factor between oxygen and nitrogen can be obtained thereby.

As a means for obtaining a highly efficient oxygen enriching membrane, extensive studies are recently under way of development for the utilization of the technique of plasma polymerization. The principle of this method is that a very thin film having a high separation factor between oxygen and nitrogen is formed by the technique of so-called plasma polymerization on a suitable substrate body having a relatively high permeability to gases which may be a uniform thin membrane substrate or a porous membrane substrate.

The inventors conducted investigations for obtaining a satisfactory substrate body to be provided with a plasma-polymerized film on the surface as an oxygen enriching membrane and have previously proposed an excellent oxygen enriching membrane in both of the gas permeation velocity and the separation factor can be obtained by providing a substrate film or a polymer of a silyl-substituted acetylene compound represented by the general formula R—C≡C—SiR$_3$, in which R is a monovalent hydrocarbon group, with a polymeric film formed by the low temperature plasma polymerization of a gaseous organosilicon compound such as divinyl tetramethyl disiloxane on the surface thereof. A gas separation membrane of this type, however, has a problem still left unsolved. While it is an important requirement in order to obtain a gas separation membrane of high performance that the plasma-polymerized polymeric film formed on the substrate surface should be uniform and homogeneous as far as possible, namely, such a condition can hardly be satisfied in the plasma polymerization due to the difficulties in controlling the parameters determinant of the conditions of the polymerization. The difficulty in this regard is particularly large when a large surface area of the substrate body should be plasma-treated with sufficient uniformity. For example, the plasma polymerization is greatly influenced by the flow of the monomer gas or the plasma-activated species within the atmosphere of plasma so that the velocity of the polymerization may widely differ from place to place to cause a large variation in the thickness of the plasma-polymerized film. Beside the unevenness in the thickness of the plasma-polymerized film, homogeneity of the film is also a difficult matter to obtain and this problem is particularly serious when the plasma polymerization is continued prolongedly. The reasons therefor presumably include instability of the electric power supply to generate the low temperature plasma, variation in the concentration of the activated species, intermixing of some contaminants with the plasma atmosphere and others. These situations cause difficulties when continuous deposition of the plasma-polymerized film on the substrate surface is desired by continuously passing a continuous-length substrate film of a polymer through an atmosphere of low temperature plasma so that industrial production of gas separation membranes is practically impossible in which reproducibility of the product characteristics is essential along with the productivity.

SUMMARY OF THE INVENTION

It is therefore an object of the present invention to provide a high-performance shaped body for gas separation or, in particular, for oxygen-enrichment of air free from the above described problems and disadvantages in the prior art materials.

Thus, the shaped body for gas separation of the invention comprises a base body shaped of a polymeric material comprising a polymer of a silyl acetylene compound represented by the general formula $$R^1-C\equiv C-SiR^2{}_3, \qquad (I)$$

in which $R^1$ is a hydrogen atom or a substituted or unsubstituted monovalent hydrocarbon group having from 1 to 8 carbon atoms and $R^2$ is a hydrogen atom, halogen atom, substituted or unsubstituted monovalent hydrocarbon group having from 1 to 8 carbon atoms or alkoxy group having from 1 to 8 carbon atoms, each $R^2$ being independent from the others and the surface of the base body having been exposed to an atmosphere of low temperature plasma of an inorganic gas.

DETAILED DESCRIPTION OF THE PREFERRED EMBODIMENTS

It is generally understood that a shaped body, e.g. film, of a polymer of the above mentioned silyl acetylene compound usually has a low resistance against ultraviolet irradiation to cause remarkable decrease in the mechanical strengths and the performance for gas separation even with a very small dose of the ultraviolet irradiation so that it was quite unexpected that certain beneficial effects can be obtained by exposing such a polymer to the atmosphere of low temperature plasma which is necessarily accompanied by ultraviolet light of high intensity over a wide range of wavelength extending from near ultraviolet to far ultraviolet and further to so-called vacuum violet. Nevertheless, the performance of a shaped body of the polymer for gas separation can be modified in the surface properties surprisingly in favor of the performance for gas separation by the treatment with low temperature plasma of an inorganic gas without being accompanied by the disadvantages of decrease in the mechanical strengths so that an industrially practicable method with good reproducibility can be provided for the preparation of gas separation membranes having, for example, a permeability coefficient to oxygen $P_{O2}$ of 3 to $5 \times 10^{-7}$ cm$^3$(STP)·cm/cm$^2$·sec·cmHg and a separation factor between oxygen and nitrogen $P_{O2}/P_{N2}$ of 2.5 to 3.5.

In the general formula (I) representing the silyl acetylene compound, $R^1$ is a hydrogen atom or a substituted or unsubstituted monovalent hydrocarbon group having from 1 to 8 carbon atoms such as methyl, ethyl, propyl and butyl groups as well as those substituted groups obtained by the replacement of a part or all of the hydrogen atoms in the above named hydrocarbon groups with substituents such as halogen atoms. Each of the groups denoted by $R^2$ in the general formula (I) is a hydrogen atom, halogen atom, substituted or unsubstituted monovalent hydrocarbon group having from 1 to 8 carbon atoms such as methyl, ethyl, propyl, butyl, vinyl and allyl groups and those substituted groups obtained by the replacement of a part of the hydrogen atoms in the above named hydrocarbon groups with substituents such as halogen atoms or an alkoxy group having from 1 to 8 carbon atoms such as methoxy, ethoxy, propoxy and butoxy groups. Examples of such a silyl acetylene compound include: 1-methyl-2-trimethylsilyl acetylene; 1-ethyl-2-trimethylsilyl acetylene; 1-methyl-2-triethylsilyl acetylene; 1-methyl-2-trimethoxysilyl acetylene; trimethylsilyl acetylene; 1-methyl-2-methyldichlorosilyl acetylene; 1-methyl-1-methylsilyl acetylene and the like.

The above described silyl acetylene compounds as a monomer can be (co)polymerized, either singly or as a mixture of two kinds or more, by the polymerization reaction carried out at a temperature in the range from 30° to 130° C. in an organic solvent such as toluene, cyclohexane and the like in the presence of a polymerization catalyst such as tungsten chloride WCl$_6$, niobium pentachloride NbCl$_5$, tantalum pentachloride TaCl$_5$ and the like. The polymer, i.e. poly(silyl acetylene), formed in the solution can be precipitated by adding a large volume of methyl alcohol and recovered in a purified form.

The base body, for example, in the form of a film for the preparation of the inventive shaped body for gas separation can be prepared by casting a solution of the thus obtained poly(silyl acetylene) dissolved in an organic solvent such as toluene, cyclohexane and the like. Although the thickness of the film may be controlled to have a sufficient mechanical strength, it is optional that the film of the poly(silyl acetylene) can be formed on a suitable supporting web such as a woven or non-woven fabric, porous sheet and the like. Suitable materials of the porous sheet as the supporting web include films of polypropylene, polyethylene, polysulfone, cellulose acetate, poly(tetrafluoroethylene), polyimide and the like.

The base body of the poly(silyl acetylene) is then subjected to a treatment with low temperature plasma. This treatment is performed by putting the base body into a plasma chamber and exposing the surface thereof to an atmosphere of low temperature plasma generated in the chamber in which, after evacuation, a suitable inorganic gas is passed to keep and control the pressure inside in the range from 0.005 to 10 Torr with impression of an electric power to the electrodes.

Examples of the inorganic gas for supporting the plasma atmosphere include rare gases such as helium, neon and argon, nitrogen, oxygen, hydrogen, water vapor, carbon dioxide, carbon monoxide, nitrogen monoxide, nitrogen dioxide, sulfur dioxide, air, halogens such as fluorine and chlorine and the like. These gases may be used as a mixture of two kinds or more according to need.

The pressure of the plasma atmosphere supported by the inorganic gas should be in the range from 0.005 to 10 Torr or, preferably, from 0.05 to 5 Torr. When the pressure is too low, the base body cannot be imparted with high performance for the gas separation as desired. When the pressure is too high, on the other hand, no stability is ensured in the electric discharge to generate the low temperature plasma.

The electric conditions for the discharge to generate low temperature plasma include a frequency in the range from 10 kHz to 100 MHz and a power input of 10 watts to 100 kilowatts. The type of the electrodes is not particularly limitative including external and internal electrodes by inductive or capacitive coupling. The time taken for the plasma treatment should be widely varied depending on various parameters such as the electric power and the like but it is usually in the range from a few seconds to 10 minutes or longer to obtain a sufficient effect of surface modification.

Following are examples to illustrate the invention in more detail but not to limit the scope of the invention in any way.

EXAMPLE 1

Polymerization of 1-methyl-2-trimethylsilyl acetylene as the monomer was performed by adding 20 g of the monomer to 200 g of toluene containing 1 g of tantalum pentachloride as a catalyst and heating the mixture at 80° C. for 5 hours. After completion of the polymerization reaction, the mixture was poured into a large volume of methyl alcohol to precipitate the polymer in a purified form which was collected by filtration and dried. This polymer was dissolved in toluene to prepare a solution from which a polymer film having a thickness of 2 μm was prepared by the technique of casting. This film is referred to as Samples I hereinbelow.

Sample I above was placed in a plasma chamber of a plasma generating apparatus which was first evacuated to a pressure of $10^{-4}$ Torr and then filled with nitrogen gas to give and maintain a pressure of 0.2 Torr under a flow of the gas and the surface of Sample I was exposed for 5 minutes to low temperature plasma generated inside the chamber by the impression of an electric power of 100 watts at a frequency of 13.56 MHz. The thus plasma-treated film is referred to as Sample Ia hereinbelow.

Permeability of Smples I and Ia to oxygen and nitrogen was measured to give the results of the permeability coefficients to oxygen $P_{O2}$ and the separation factors between oxygen and nitrogen $P_{O2}/P_{N2}$ shown in Table 1 below.

EXAMPLE 2

Sample I prepared in Example 1 was placed in the plasma chamber which was first evacuated to a pressure of $10^{-4}$ Torr and then filled with hydrogen gas to give and maintain a pressure of 0.4 Torr under a flow of the gas and the surface of the Sample I was exposed for 3 minutes to low temperature plasma generated by the impression of an electric power of 100 watts at a frequency of 110 kHz. The thus plasma-treated film is referred to as Sample Ib hereinbelow. The results of the gas permeation tests undertaken with this Sample Ib in the same manner as in Example 1 are shown in Table 1.

EXAMPLE 3

Sample I prepared in Example 1 was placed in the plasma chamber which was first evacuated to a pressure of $10^{-4}$ Torr and then filled with helium gas to give and maintain a pressure of 1 Torr under a flow of the gas and the surface of the Sample I was exposed for 20 seconds to low temperature plasma generated in the chamber by the impression of an electric power of 5 kilowatts at a frequency of 110 kHz. The thus plasma-treated film is referred to as Sample Ic hereinbelow. The results of the gas permeation tests undertaken with this Sample Ic in the same manner as in Example 1 are shown in Table 1.

EXAMPLE 4

Polymerization of 1-ethyl-2-trimethylsilyl acetylene as the monomer was performed by adding 10 g of the monomer to 300 g of toluene containing 2 g of tantalum pentachloride as the catalyst and heating the mixture at 100° C. for 4 hours. After completion of the polymerization reaction, the mixture was poured into a large volume of methyl alcohol to precipitate the polymer in a purified form which was collected by filtration and dried. This polymer was dissolved in toluene to prepare a solution from which a polymer film having a thickness of 2 μm was prepared by the technique of casting. This film is referred to as Sample II hereinbelow.

Sample II above was placed in the plasma chamber which was first evacuated to a pressure of $10^{-4}$ Torr and then filled with argon gas to give and maintain a pressure of 0.1 Torr under a flow of the gas and the surface of the Sample II was exposed for 30 seconds to low temperature plasma generated in the chamber by the impression of an electric power of 2 kilowatts at a frequency of 13.56 MHz. The thus plasma-treated film is referred to as Sample IIa hereinbelow. The results of the gas permeation tests undertaken with this Sample IIa in the same manner as in Example 1 are shown in Table 1.

TABLE 1

| Sample | Permeability coefficient $P_{O2}$ to oxygen* | Separation factor between oxygen and nitrogen $P_{O2}/P_{N2}$ |
| --- | --- | --- |
| I | $8.1 \times 10^{-7}$ | 1.42 |
| Ia | $3.8 \times 10^{-7}$ | 3.97 |
| Ib | $5.1 \times 10^{-7}$ | 3.11 |
| Ic | $4.4 \times 10^{-7}$ | 3.26 |
| II | $6.3 \times 10^{-7}$ | 1.67 |
| IIa | $3.5 \times 10^{-7}$ | 3.42 |

*$cm^3(STP) \cdot cm/cm^2 \cdot sec \cdot cmHg$

What is claimed is:

1. A shaped body for gas separation which comprises a base body shaped of a polymeric material comprising a polymer of a silyl acetylene compound represented by the general formula $$R^1-C\equiv C-SiR^2_3,$$

in which $R^1$ is a hydrogen atom or a substituted or unsubstituted monovalent hydrocarbon group having from 1 to 8 carbon atoms and $R^2$ is, each $R^2$ being independent from the others, selected from the class consisting of a hydrogen atom, halogen atoms, substituted or unsubstituted monovalent hydrocarbon groups having from 1 to 8 carbon atoms and alkoxy groups having from 1 to 8 carbon atoms, the surface of the base body having been exposed to an atmosphere of low temperature plasma of an inorganic gas.

2. The shaped body for gas separation as claimed in claim 1 wherein the monovalent hydrocarbon group denoted by $R^1$ is selected from the class consisting of methyl, ethyl, propyl and butyl groups.

3. The shaped body for gas separation as claimed in claim 1 wherein the monovalent hydrocarbon group denoted by $R^2$ is selected from the class consisting of methyl, ethyl, propyl, butyl, vinyl and allyl groups.

4. The shaped body for gas separation as claimed in claim 1 wherein the alkoxy group denoted by $R^2$ is selected from the class consisting of methoxy, ethoxy, propoxy and butoxy groups.

5. The shaped body for gas separation as claimed in claim 1 wherein the silyl acetylene compound is selected from the class consisting of 1-methyl-2-trimethylsilyl acetylene, 1-ethyl-2-trimethylsilyl acetylene, 1-methyl-2-triethylsilyl acetylene, 1-methyl-2-trimethoxysilyl acetylene, trimethylsilyl acetylene, 1-methyl-2-methyldichlorosilyl acetylene and 1-methyl-2-methylsilyl acetylene.

6. The shaped body for gas separation as claimed in claim 1 wherein the inorganic gas is selected from the class consisting of helium, neon, argon, nitrogen, oxygen, air, hydrogen, water vapor, carbon dioxide, carbon monoxide, nitrogen monoxide, nitrogen dioxide, sulfur dioxide, fluorine and chlorine.

7. The shaped body for gas separation as claimed in claim 1 wherein the low temperature plama is generated in an atmosphere of the inorganic gas under a pressure in the range from 0.005 to 10 Torr.

* * * * *